3,303,197
METHOD OF FLUORINATING PENTA-CHLOROPYRIDINE
Robert Neville Haszeldine, Windyridge, Lyme Road, Disley, England, and Ronald Eric Banks, Manchester 19, England
No Drawing. Filed Nov. 2, 1964, Ser. No. 408,316
Claims priority, application Great Britain, Mar. 17, 1964, 11,249/64
2 Claims. (Cl. 260—290)

This invention relates to the production of halogenated heterocyclic hydrocarbons. More particularly, the invention is concerned with a new method of producing pentafluoropyridine and with novel halogenated pyridines produced during that process.

In accordance with the present invention, pentachloropyridine (I) is heated with potassium fluoride to yield pentafluoropyridine (II), 3 - chlorotetrafluoropyridine (III), and 3,5-dichlorotrifluoropyridine (IV), according to the following reaction:

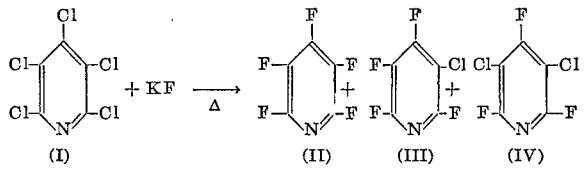

It is desirable that the potassium fluoride should be present in excess and the molar ratio of potassium fluoride to pentachloropyridine preferably lies in the range 1:1 to 20:1, particularly 5:1 to 10:1.

The reaction is preferably carried out by heating pentachloropyridine with anhydrous potassium fluoride, generally at a temperature of 300 to 550° C., particularly 400 to 550° C., and under autogenous pressure, e.g. 3 to 200 atmospheres. However, the reaction may alternatively be carried out at about 200° C. in a polar solvent such as N-methyl-2-pyrrolidone, dimethyl sulphone, ethylene carbonate, formamide, N-methyl acetamide, N-methyl formamide, dimethyl formamide, and tetramethylene sulphone. The first two of these solvents are most effective, but dimethyl sulphone has the disadvantage of being a solid at room temperature.

The invention also provides the new compounds 3-chlorotetrafluoropyridine and 3,5 - dichlorotrifluoropyridine. These compounds are produced in larger amounts when a solvent is used for the reaction. They have similar uses to pentafluoropyridine itself, viz as a chemical intermediate in the preparation of dyestuffs, physiologically active chemicals, and agricultural chemicals, e.g. fungicides and insecticides.

The absence of a solvent favors the formation of pentafluoropyridine, which can then be produced in 60–70% yield, the yield of 3-chlorotetrafluoropyridine being from 20 to 60% and only small amounts of 3,5-dichlorotrifluoropyridine being produced. The fact that this synthesis can be carried out without the use of expensive polar solvents, which generally have poor thermal stability is of considerable importance industrially.

The invention is illustrated in the examples which follow:

*Example 1.—Preparation of starting material, pentachloropyridine*

(a) Phosphorus pentachloride (250.0 g.) and dry pyridine (16.6 g.) were heated for sixteen hours at 390° C. in a 300 ml. high-pressure autoclave. The maximum pressure observed was 210 atmospheres, and the pressure dropped during the reaction to 30 atmospheres when cool. The contents were vented and the products added to water. Steam distillation of the products gave a white material which solidified in the condenser, and this was removed, washed and dried, then recrystallized twice from ethanol and from petroleum ether, yielding pentachloropyridine, M.P. 125° C. (51.0 g.; 50% yield) (Found: C, 24.6; Cl, 70.8; N, 6.3. Calc. for pentachloropyridine: C, 23.9; Cl, 70.5; N, 5.6).

(b) Pyridine (48.0 g.) and phosphorus pentachloride (750 g.) were heated in a 1-liter stainless steel autoclave at 350° C. for 20 hours. The product was treated cautiously with water (1000 ml.) and the resulting mixture was steam-distilled to yield a crude solid (110.0 g.), M.P. 74° C., that was recrystallized from ethanol to yield pentachloropyridine (43.0 g.) (Found: C, 24.3; Cl, 69.8; N, 5.6%. Calc. for $C_5Cl_5N$: C, 23.9; Cl, 70.5; N, 5.6%), M.P. 126° C.

*Example 2.—Preparation of pentafluoropyridine and chlorofluoropyridines in the absence of a solvent*

Pentachloropyridine and a 2 molar excess of anhydrous potassium fluoride were heated at 470° C. in a 300 ml. autoclave for twelve hours. The following products were obtained (i) pentafluoropyridine (65% yield) B.P. 83.5°, (ii) 3-chlorotetrafluoropyridine (18% yield) B.P. 120°, and (iii) 3,5 - dichlorotrifluoropyridine (5% yield) B.P. 160°.

*Example 3.—Preparation of pentafluoropyridine in absence of solvent*

Pentachloropyridine and a 10-fold molar excess of anhydrous potassium fluoride were heated at 500° C. in an autoclave for 12 hours. The yield of pentafluoropyridine was 75%.

*Example 4.—Preparation of chlorofluoropyridines*

Anhydrous potassium fluoride was dried for 48 hours at 150° C. in vacuo. N-methyl-2-pyrrolidone was dried by distillation. Dry KF (35.0 g.) and N-methyl-2-pyrrolidone (100 ml.) were heated to 200° C. in a 500 ml. three-necked flask fitted with stirrer, Claisen head, thermometer and dropping funnel. Pentachloropyridine (4.86 g.) in N-methyl-2-pyrrolidone (60 ml.) was added over thirty minutes and the temperature was maintained, with stirring, for a further twenty-four hours. No volatile material was found in cold traps attached to the condenser. The KF/N-methyl-2-pyrrolidone slurry was fractionally distilled to give a fraction (6.25 g.) B.P. 156–195° C. This fraction was washed free from solvent with water. Gas liquid chromatography and infrared spectroscopic examination showed the fraction to contain 3.6 g. of a mixture (63:35 ratio) of 3-chlorotetrafluoropyridine with 3,5-dichlorotrifluoropyridine. This represents a 32% conversion of pentachloropyridine into chlorofluoropyridines.

*Example 5.—Preparation of pentafluoropyridine and chlorofluoropyridines in solvent*

A mixture of pentachloropyridine (26.0 g.), anhydrous potassium fluoride (60.5 g.), and N-methyl-2-pyrrolidone (200 ml.) was heated at 200° C. for 20 hours in a 1-liter autoclave fitted with a high-speed stirrer. The product was filtered and the filtrate was distilled, to yield a fraction B.P. <190° (4.2 g.) that was shown by gas-liquid chromatography to contain pentafluoropyridine, 3-chlorotetrafluoropyridine, and 3,5-dichlorotrifluoropyridine.

*Example 6.—Preparation of chlorofluoropyridines in solvent*

Pentachloropyridine (18.3 g.) in N-methyl-2-pyrrolidone (100 ml.) was added to a stirred slurry of anhydrous potassium fluoride (54.4 g.) in N-methyl-2-pyrrolidone (50 ml.) kept at 200° C. in a Pyrex flask equipped with a reflux condenser leading to a cold trap (−72°). The reaction mixture was stirred at 200° for 23 hours while a slow stream of nitrogen was passed through the apparatus. The product was filtered and the filtrate was distilled to yield 3-chlorotetrafluoropyridine (1.6 g.) (Found: C, 32.3; N, 7.0%. $C_5ClF_4N$ requires C, 32.5; N, 7.5%), B.P. 121°/760 mm. and 3,5-dichlorotrifluoropyridine (2.6 g.) (Found: C, 28.7; N, 6.7%. $C_5Cl_2F_3N$ requires C, 29.8; N, 6.9%), B.P. 150°/760 mm.

*Example 7.—Preparation of 3,5-dichlorotrifluoropyridine in solvent*

A mixture of pentachloropyridine (3.0 g.), anhydrous potassium fluoride (6.5 g.), and N-methyl-2-pyrrolidone (15 ml.) was heated in a 15-ml. Pyrex ampoule at 200° for 20 hours. The product was filtered and the filtrate was distilled, to yield 3,5 - dichlorotrifluoropyridine (0.8 g.).

We claim:

1. A process for preparing fluoro derivatives of pentachloropyridine which comprises reacting pentachloropyridine with anhydrous potassium fluoride in the absence of a solvent in a closed vessel at a temperature within the range of from about 300° C. to about 550° C. at an autogenous pressure and recovering as the products a major proportion of pentafluoropyridine and minor proportions of 3-chlorotetrafluoropyridine and 3,5-dichlorotrifluoropyridine.

2. A process according to claim 1 in which the temperature is in the range of from about 400° C. to about 550° C.

References Cited by the Examiner

Gutowski et al.: J. Org. Chem., vol. 28, pp. 1666–8 (1963).

Hutchinson et al.: J. Chem. Society, England 1964, pp. 3573–6, published October 1964. Abstracted from C.A. vol. 61, par. 14653.

WALTER A. MODANCE, *Primary Examiner.*

ALAN L. ROTMAN, *Assistant Examiner.*